United States Patent

Venditty

[15] 3,659,533

[45] May 2, 1972

[54] DEVICE FOR SECURING VEHICLE TO TRANSPORTER DOOR

[72] Inventor: Anthony Venditty, Warren, Mich.

[73] Assignee: General Motors Corporation, Detroit, Mich.

[22] Filed: Nov. 16, 1970

[21] Appl. No.: 89,711

[52] U.S. Cl.....................105/368 R, 105/368 T, 248/119 R
[51] Int. Cl......................B60p 7/08, B61d 45/00, B65j 1/22
[58] Field of Search.....................105/368 R, 368 T; 214/41; 248/119 R

[56] References Cited

UNITED STATES PATENTS

| | | |
|---|---|---|
| 1,750,129 | 3/1930 | Romine...............................105/368 R |
| 2,996,020 | 8/1961 | Udstad..................................105/367 |
| 3,182,610 | 5/1965 | Jones...................................105/368 R |

OTHER PUBLICATIONS

Southern Pacific Bulletin, July 1969, " Giant Car Will Carry 30 Small Autos,"

Primary Examiner—Drayton E. Hoffman
Attorney—J. L. Carpenter and E. J. Biskup

[57] ABSTRACT

A securement device for maintaining a vehicle in a secured position on an upright transporter door and having a first section adapted to be located in an oblong slot formed in the underbody of the vehicle and a second section for automatic locking engagement with a projecting member rigidly mounted on the transporter door when the vehicle is driven onto the door.

3 Claims, 6 Drawing Figures

Patented May 2, 1972

3,659,533

INVENTOR.
Anthony Venditty
BY
E. J. Bishop
ATTORNEY

DEVICE FOR SECURING VEHICLE TO TRANSPORTER DOOR

My copending patent application U.S. Ser. No. 879,659, entitled "Vehicle Transporter," filed Nov. 25, 1969, and assigned to the assignee of this invention discloses a closed wheeled transporter in the form of a railway car which has the individual sides thereof provided with hinged doors that are movable about a horizontal axis extending longitudinally of the vehicle. Each door serves as a ramp when in the lowered position to permit a vehicle to be driven thereon, and in order to provide correct loading, a pair of guide tracks are formed on the inner side of the door for proper wheel guidance. Hooks are provided between the guide tracks and keepers are located on the underside of the vehicle for engaging the hooks. In addition, suitable wells are formed along each guide track for accommodating the wheels of the vehicle and positioning the keepers slightly behind the hooks. The door is normally inclined downwardly relative to the railway car so that upon raising the door the vehicle rolls slightly forward and causes the keepers to engage the hooks. The weight of the vehicle provides a downward force which helps retain the vehicle in a holddown position on the door.

The present invention concerns a securement device particularly adapted for use with vehicles that are to be automatically fastened to a transporter door and maintained in an upright position on the door in the manner described above. The securement device made according to the present invention can be quickly mounted to the underbody of the vehicle and is adapted to remain in a predetermined position relative thereto under various vehicle operating conditions prior to engagement with the engageable members provided on the door. In addition, once the securement device is coupled to the transporter door and the latter is closed so as to locate the vehicle in a vertical attitude, the vehicle is essentially locked in position on the door so as to prevent any excessive relative movement between the two.

More specifically, a securement device has a retaining section adapted to be located in an oblong slot formed in the underbody of the vehicle and an engaging section adapted to cooperate with a projecting member rigidly mounted on the transporter door. The engaging section takes the form of a depending body portion which is automatically engageable with the projecting member as the vehicle is driven onto the transporter door. Flat surfaces are formed on the upper part of the body portion adjacent opposite ends thereof and are of a width greater than the length of the oblong slot. At least one of the aforementioned flat surfaces is inclined downwardly from the other flat surface and is integrally formed with an upwardly extending neck portion, the upper part of which is of a size and configuration substantially the same as the slot so when the upper part of the body portion is located within the slot, essentially all relative movement between the two is prevented. An elongated head is formed on the upper part of the neck portion and has outwardly projecting sections formed therewith and located on opposite sides of the neck portion along the longitudinal axis thereof. The projecting sections are insertable through the slot for engagement with the inner surface of the underbody when the upper part of the neck portion fills the slot. In addition, a flexible member is secured to the body portion adjacent the neck portion and cooperates with the aforesaid projecting sections for retaining the securement device in a fixed position relative to the vehicle.

Accordingly, the objects of the present invention are to provide a securement arrangement in the form of hook and socket members in which one of the members can be removably attached to the underbody of the vehicle and will be maintained in a predetermined position relative thereto prior to engagement with the other member; to provide a securement device having a retaining section that is insertable within an oblong slot formed in the underbody of a vehicle and having a neck portion which essentially fills the slot so as to prevent relative movement between the securement device and the vehicle underbody; to provide a securement device which takes the form of a keeper or socket member having a part thereof that is removably insertable within an opening in the underbody of a vehicle and is adapted to be automatically coupled to a hook member formed on a transporter door when the vehicle is driven onto the door; and to provide a securement device for engagement with projecting members on a transporter door that can be quickly attached to or removed from the underbody of a vehicle and which maintains correct alignment relative to the underbody during movement or braking of the vehicle.

A better understanding of the present invention can be obtained from the following detailed description when taken in conjunction with the drawing in which.

Figure 1:
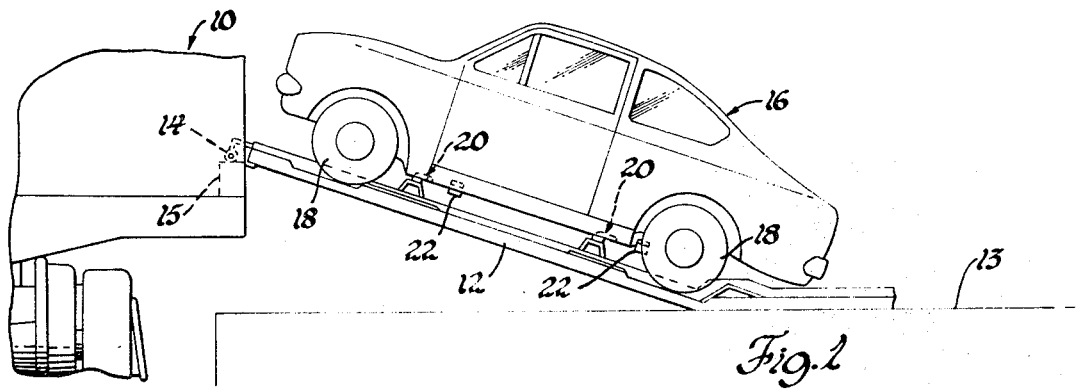
FIG. 1 is a view showing a transporter door supporting a vehicle incorporating a securement device made according to the invention.

Referring to the drawing and particularly FIG. 1 thereof, an end view of a portion of a railway car 10 is shown having a door 12, one end of which rests on a loading platform 13, while the other end is hingedly connected by a pivotal connection 14 to a brace member 15 which forms a rigid part of the railway car 10. The pivotal connection 14 permits the door 12 to be rotated about a horizontal axis extending parallel to the longitudinal axis of the railway car 10 so that the door assumes an upright closed position for retaining a vehicle 16 in a vertical attitude. In this regard, it will be noted that the inner surface of the door is provided with a pair of laterally spaced guide tracks (not shown) for the wheels 18 of the vehicle 16 and also rigidly supports four identically formed hook members located between the guide tracks and each identified by the reference numeral 20. Only two of the hook members 20 are shown in FIG. 1 and it will be understood that an identical pair are spaced laterally therefrom. The hook members 20 are adapted to engage four identical securement devices, each identified by the reference numeral 22, mounted to the underbody of the vehicle 16. The coupling of the securement devices and the hook members occurs as the vehicle 16 is driven up the door 12 along the guide tracks and, after coupling, the vehicle 16 is essentially locked to the door. A more complete description of the door construction as well as the manner that the vehicle 16 is automatically secured thereto can be obtained from the aforementioned patent application.

Figures 2, 3:
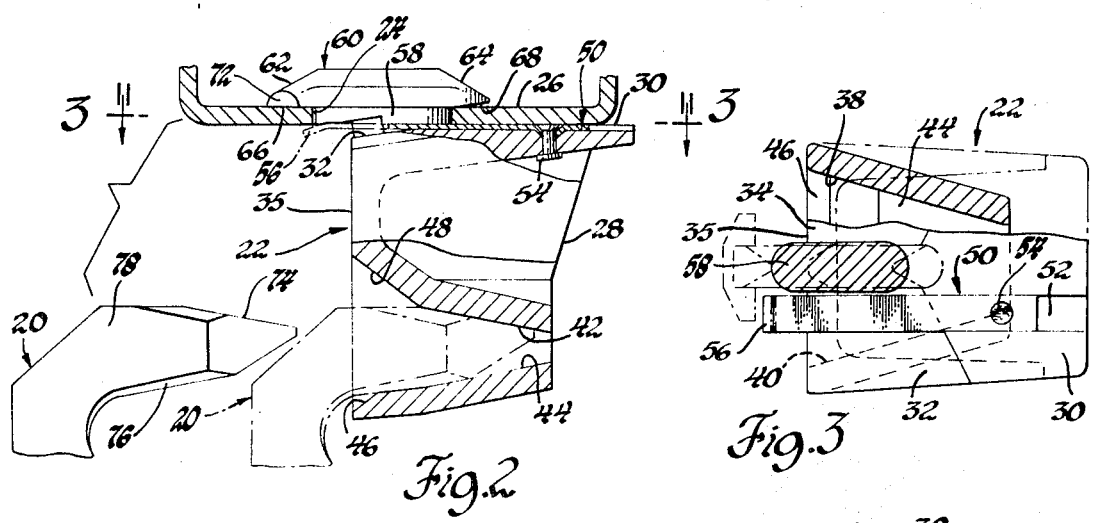
FIG. 2 is an enlarged view showing the securement device attached to the underbody of the vehicle of FIG. 1 and located adjacent to a hook member which cooperates with the securement device for retaining the vehicle in a fixed position on the transporter door.
FIG. 3 is a plan view of the securement device of FIG. 2 taken on line 3—3 thereof.

As aforementioned, all four of the securement devices 22 attached to the underbody of the vehicle are identical in construction. Accordingly, only one securement device shall be described in detail, it being understood that the other securement devices have corresponding parts functioning in the same manner as will be explained hereinafter. As seen in FIGS. 2 and 3, the securement device 22 made according to the invention takes the form of a keeper or socket member and generally comprises an upper retaining section and a lower depending engaging section. The retaining section is adapted to be inserted through an oblong slot 24 formed in a flat plate section 26 of the vehicle underbody, while the engaging section is adapted to mate with one of the hook members 20 rigidly secured to the door 12.

Figure 6:
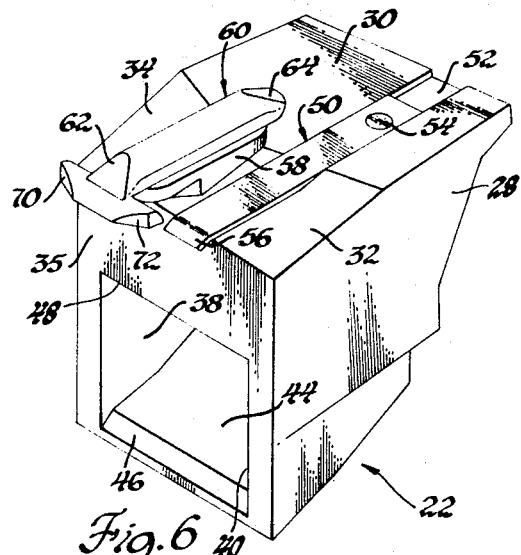
FIG. 6 is a perspective view of the securement device shown in the aforementioned figures.

More specifically and as seen in FIGS. 2, 3 and 6, the engaging section comprises a body portion 28 which in outward appearance resembles a block and has the upper part thereof formed with a flat surface 30 located adjacent one end of the body. The other end of the upper part of the body portion 28 is formed with a pair of angularly related surfaces 32 and 34, both of which are downwardly inclined relative to surface 30. The front part of the body portion 28 is formed with a front flat face 35 located in a vertical plane and has a rectangular entrance that leads to an opening in the body portion 28 that serves as a keeper for the hook member 20. As seen in FIGS. 2 and 3, the opening is defined in part by a pair of converging planar side surfaces 38 and 40 and converging upper and lower planar surfaces 42 and 44. In addition, the upper and lower surfaces 42 and 44 merge with converging planar pilot surfaces 46 and 48 at the entrance of the opening that compensate for any minor misalignment between the opening and the hook member 20 as the vehicle is being driven onto the transporter door 12. A leaf spring 50 is located within an elongated groove 52 formed in surface 30 and has one end thereof secured to the body portion 28 by a fastener 54. The other end of the leaf spring 50 extends forwardly beyond the front flat face 35 of the body portion and terminates with a downwardly bent lip 56 that normally engages the lower contact surface of plate section 26 and aids in maintaining the securement device in a predetermined position relative to the plate section.

The retaining section is integrally formed with the upper part of body portion 28 between surfaces 32 and 34 and includes a neck portion 58, the upper part of which is of a size and configuration essentially the same as the slot 24 formed in the plate section 26. An elongated head portion 60 is integrally formed with the upper part of the neck portion 58 and has forwardly and rearwardly projecting sections 62 and 64 respectively located along the longitudinal axis of the neck portion. The forwardly and rearwardly projecting sections 62 and 64 are respectively formed with downwardly facing surfaces 66 and 68, and it will be noted that surface 66 is located in a plane parallel to surface 30, while surface 68 is located in a plane parallel to a horizontal plane passing through the line established by the intersection of surfaces 32 and 34. Also, the forwardly projecting section 62 is formed with laterally extending arms 70 and 72.

As mentioned hereinbefore, the securement device 22 is attachable to the underbody of the vehicle 16 and will maintain a predetermined position relative thereto while the vehicle 16 is being driven onto the door 12 prior to engagement with the hook members 20. Accordingly, as the vehicle 16 is driven along the guide tracks formed on the door, each securement device 22 will be properly positioned relative to the vehicle for coupling action with a hook member 20. In this regard, it will be noted that when a hook member 20 is fully engaged with a securement device 22, it will assume the position shown in FIG. 2 in phantom lines. At such time, the engaged securement device 22 and the hook member 20 are essentially locked together preventing sidewise or up and down movement of the securement device 22 relative to the hook member. This occurs because the configuration of the hook member is generally complementary to the shape of the opening in the body portion 28. Thus, surfaces 74 and 76 on hook member 20 have surface-to-surface contact with surfaces 42 and 44 respectively, and side surfaces 78 (one of which only is shown) on the hook member have surface-to-surface contact with surfaces 38 and 40.

In addition, it will be noted that as seen in FIG. 1, when the four securement devices 22 have the openings thereof fully engaging the four hook members 20 so that each of the latter assumes the phantom line position of FIG. 2, each securement device 22 is placed in a locked position relative to the plate section 26 and essentially no movement of any of the securement devices relative to the vehicle can occur. As a result, any tendency for the vehicle 16 to be moved sideways or toward or away from the door along an axis perpendicular to the door is resisted by the engaged hook members and securement devices. It will also be noted that in one form of the invention the opening in the securement device 22 and the engaging portion of the hook member 20 are longitudinally sized so that any upward movement of the vehicle 16 relative to the door 12 when the latter is closed, will not cause the securement devices 22 to be freed from the hook members 20. As an alternate method of preventing the vehicle 16 from raising off the hook members while in transit, a latching arrangement can be incorporated with the door 12 that will automatically position a lock bar immediately to the right of the securement device 22 as seen in FIG. 2 when the door 12 is closed.

Figure 4:
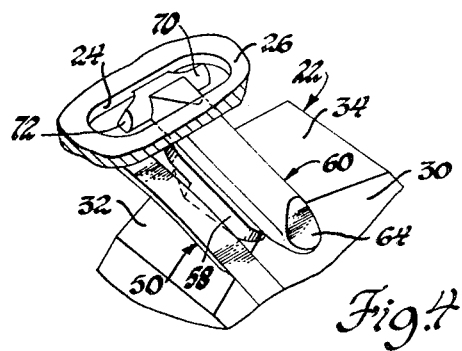
FIG. 4 is a perspective view showing the first step in inserting the head portion of the securement device into a slot formed in the underbody of the vehicle.
Figure 5:
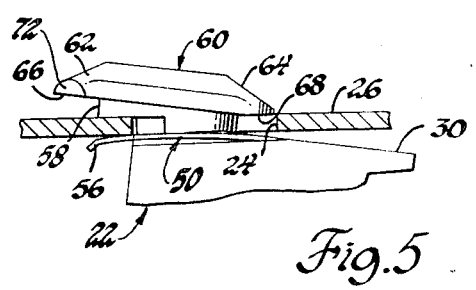
FIG. 5 illustrates one of the relative positions of the underbody and the securement device during the insertion of the head portion of the securement device into the slot formed in the vehicle underbody.

The mounting procedure for attaching the securement device 22 to the underbody is as follows: With reference to FIGS. 4 and 5, the securement device 22 is first positioned beneath the vehicle underbody with the longitudinal axis of the head portion 60 located substantially normal to the major axis of the slot 24. The arms 70 and 72 of the forwardly projecting section 62 are first inserted into the slot 24 and thereafter the entire securement device 22 is rotated 90° permitting the remainder of the head portion 60 to be moved through the slot 24 as seen in FIG. 5. By having the upper part of the neck portion 58 extend forwardly of the front face 35 of the body and having the lower part of the neck portion in line with the aforesaid front face, the head portion 60 can then assume the position shown in FIG. 5. Thereafter, the securement device 22 is moved rearwardly along a horizontal axis and such movement is permitted by the surface 68 which is upwardly inclined and formed on the rearwardly projecting section 64. The upper part of the neck portion 58 will then drop into the slot 24 and the securement device 22 assumes the position shown in FIG. 2. At such time, the leaf spring 50 engages the undersurface of the plate section 26, while surface 66 and a part of surface 68 engage the top surface of the plate section 26 and serve to retain the securement device 22 in position.

It should be apparent from the above that in the absence of a leaf spring 50, it would be possible for the securement device 22 to be shifted as a unit out of the position shown in FIG. 2 into the position shown in FIG. 5, particularly if the vehicle is being driven forwardly and then suddenly braked. This would occur because, during braking, the relatively large depending mass of the engaging section would be subjected to forwardly directed inertial forces and cause it to rotate clockwise (as seen in FIG. 2) with the result that the front end of the neck portion 58 would pivot out of the slot 24 and move forwardly. The leaf spring 50, however, prevents this from occurring by providing a counteracting force applied to the underbody of the vehicle 16.

Various changes and modifications can be made in this construction without departing from the spirit of the invention. Such changes and modifications are contemplated by the inventor and he does not wish to be limited except by the scope of the appended claims.

I claim:

1. A securement device for maintaining a vehicle in a secured position on a transporter and having a head adapted to be located in a slot formed in the underbody of the vehicle for attaching the securement device to the vehicle, a body portion integrally formed with said head and adapted to cooperate with a member rigidly mounted on the transporter for holding the vehicle on said transporter, said underbody including a plate section having a pair of parallel contact surfaces formed on the opposite sides thereof so when the securement device is attached to said underbody the head is located adjacent one contact surface and the body portion is located adjacent the other contact surface, a first bearing surface formed on said body portion, a neck portion extending outwardly from and integrally formed with said body portion adjacent said first bearing surface, axially aligned and outwardly projecting sections formed with the head on opposite sides of the neck portion, one of said projecting sections having a second bearing surface formed therewith and facing said first bearing surface, and means carried by said body portion and adapted to engage said plate section, said means cooperating with said first bearing surface and said neck portion for maintaining said second bearing surface substantially parallel to the opposed contact surfaces so that said securement device is located in a predetermined position relative to the plate section prior to engagement with the member on said transporter.

2. A securement device for maintaining a vehicle in a secured position on a transporter and having a head adapted to be located in a slot formed in the underbody of the vehicle for attaching the securement device to the vehicle, a body portion integrally formed with said head and adapted to cooperate with a member rigidly mounted on the transporter for holding the vehicle on said transporter, said underbody including a plate section normally located in a horizontal plane and having a pair of parallel flat contact surfaces formed on the opposite sides thereof so when the securement device is attached to said underbody the head is located adjacent one contact surface and the body portion is located adjacent the other contact surface, a first bearing surface formed on said body portion, a neck portion extending outwardly from and integrally formed with said body portion adjacent said first bearing surface, said neck portion serving to join the head to the body portion and being of a size and configuration that will permit the neck portion to be located in the slot and prevent any relative movement between the securement device and the plate section along axes lying in a plane parallel to the contact surfaces, axially aligned and outwardly projecting sections formed with the head on opposite sides of the neck portion along the longitudinal axis thereof, one of said projecting sections having a second bearing surface formed therewith, said second bearing surface facing said first bearing surface, and means carried by said body portion engaging said plate section and cooperating with said first bearing surface and said neck portion for maintaining said second bearing surface substantially parallel to the opposed contact surfaces so that said securement device is located in a predetermined position relative to the plate section prior to engagement with the member on said transporter.

3. A securement device for maintaining a vehicle in a secured position on an upright transporter door and having an elongated head adapted to be located in an oblong slot formed in the underbody of the vehicle for attaching the securement device to the vehicle, a body portion integrally formed with said elongated head and adapted to cooperate with a projecting member rigidly mounted on the transporter door for holding the vehicle on said transporter door, said underbody including a plate section normally located in a horizontal plane and having parallel flat contact surfaces formed on the opposite sides thereof so when the securement device is attached to said underbody the elongated head is located adjacent one contact surface and the body portion is located adjacent the other contact surface, a first planar bearing surface formed on said body portion, said first planar bearing surface being of a width and length greater than the length of said oblong slot, a neck portion extending outwardly from and integrally formed with said body portion adjacent said planar bearing surface, said neck portion serving to join the elongated head to the body portion and being of a size and configuration that will permit the neck portion to be located in the oblong slot and prevent any relative movement between the securement device and the plate section along axes lying in a plane parallel to the contact surfaces, axially aligned and outwardly projecting sections formed with the elongated head on opposite sides of the neck portion along the longitudinal axis thereof, one of said projecting sections having a second planar bearing surface formed therewith, said second planar bearing surface being parallel to and facing said first planar bearing surface, and a leaf spring carried by said first planar bearing surface along an axis substantially parallel to the longitudinal axis of the elongated head, said leaf spring engaging said plate section and cooperating with said first planar bearing surface and the neck portion for maintaining said second planar bearing surface substantially parallel to the opposed contact surfaces whereby said securement device is located in a predetermined position relative to the plate section prior to engagement with the projecting member on said door.

* * * * *